(12) United States Patent
Shepler

(10) Patent No.: US 8,561,659 B2
(45) Date of Patent: Oct. 22, 2013

(54) TIRE AND ELECTRONIC DEVICE ASSEMBLY

(75) Inventor: Peter Ross Shepler, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 929 days.

(21) Appl. No.: 12/546,352

(22) Filed: Aug. 24, 2009

(65) Prior Publication Data

US 2011/0041977 A1    Feb. 24, 2011

(51) Int. Cl.
*B60C 23/00* (2006.01)

(52) U.S. Cl.
USPC ....................................... 152/152.1

(58) Field of Classification Search
USPC ............................. 152/152.1, 450
See application file for complete search history.

(56) References Cited

U.S. PATENT DOCUMENTS

| | | | |
|---|---|---|---|
| 5,500,065 A * | 3/1996 | Koch et al. ............. | 156/123 |
| 5,573,611 A | 11/1996 | Koch et al. ............. | 152/152.1 |
| 5,971,046 A | 10/1999 | Koch et al. ............. | 152/152.1 |
| 6,192,951 B1 | 2/2001 | Maruyama et al. ........ | 152/152.1 |
| 6,244,104 B1 | 6/2001 | Koch et al. ............. | 73/146 |
| 6,309,494 B1 | 10/2001 | Koch et al. ............. | 156/153 |
| 6,388,567 B1 | 5/2002 | Bohm et al. ............. | 340/442 |
| 6,443,198 B1 | 9/2002 | Koch et al. ............. | 152/152.1 |
| 6,444,069 B1 | 9/2002 | Koch et al. ............. | 156/123 |
| 6,474,380 B1 | 11/2002 | Rensel et al. ............ | 152/152.1 |
| 6,477,894 B1 | 11/2002 | Koch et al. ............. | 73/146 |
| 6,524,415 B1 | 2/2003 | Youngman et al. ......... | 156/123 |
| 6,546,982 B1 | 4/2003 | Brown et al. ............ | 152/152.1 |
| 6,653,936 B2 | 11/2003 | Bohm et al. ............. | 340/442 |
| 6,668,884 B2 | 12/2003 | Koch et al. ............. | 152/152.1 |
| 6,688,353 B1 | 2/2004 | Koch ................... | 152/152.1 |
| 6,705,365 B1 | 3/2004 | Wilson ................. | 152/152.1 |
| 6,788,192 B2 * | 9/2004 | Shimura ................ | 152/152.1 |
| 6,798,140 B2 | 9/2004 | Reim et al. ............. | 315/76 |
| 6,854,324 B2 | 2/2005 | Landes et al. ........... | 73/146 |
| 6,860,303 B2 | 3/2005 | Rensel et al. ............ | 152/152.1 |
| 6,885,291 B1 | 4/2005 | Pollack et al. ........... | 340/445 |
| 6,899,153 B1 * | 5/2005 | Pollack et al. ........... | 152/152.1 |
| 6,919,799 B2 | 7/2005 | Wilson et al. ............ | 340/447 |
| 7,082,818 B2 | 8/2006 | Wilson ................. | 73/146.5 |
| 7,151,495 B2 | 12/2006 | Strache et al. ........... | 343/713 |
| 7,468,655 B2 | 12/2008 | Logan .................. | 340/442 |
| 7,478,554 B2 | 1/2009 | Roth et al. .............. | 73/146 |

(Continued)

FOREIGN PATENT DOCUMENTS

WO    99/29525    6/1999    ........ B60C 23/04

OTHER PUBLICATIONS

Japanese Patent Abstract, Publication No. 20010633325, Published Mar. 13, 2001.

(Continued)

*Primary Examiner* — Steven D Maki
(74) *Attorney, Agent, or Firm* — Richard B. O'Planick

(57) ABSTRACT

A tire and electronic device assembly is disclosed, the electronic device measuring one or more tire parameters. The electronic device attaches to a cellular insert member to create a sub-assembly, the insert member having an inward surface attached on a centerline of the tire to an inward facing tire surface defining a tire cavity. The electronic device attaches to the cellular insert member between raised regions of the cellular insert member with an outward surface of the device uncovered and exposed and recessed below outward boundaries of the raised regions.

4 Claims, 9 Drawing Sheets

(56) References Cited

U.S. PATENT DOCUMENTS

| | | | |
|---|---|---|---|
| 7,598,877 B2 | 10/2009 | Lionetti | 340/572.8 |
| 2004/0017291 A1 | 1/2004 | Hardman et al. | 340/505 |
| 2004/0094251 A1 | 5/2004 | Strache et al. | 152/152.1 |
| 2004/0134578 A1 | 7/2004 | Kleckner | 152/152.1 |
| 2004/0140030 A1 | 7/2004 | Hahn et al. | 152/152.1 |
| 2004/0182494 A1 | 9/2004 | Dominak et al. | 156/110.1 |
| 2005/0059308 A1 | 3/2005 | Parsons | 442/149 |
| 2005/0076982 A1 | 4/2005 | Metcalf et al. | 152/152.1 |
| 2005/0076992 A1 | 4/2005 | Metcalf et al. | 156/110.1 |
| 2005/0274448 A1 | 12/2005 | Lettieri et al. | 156/110.1 |
| 2006/0272759 A1* | 12/2006 | Yukawa | 152/450 |
| 2007/0018804 A1* | 1/2007 | Strache et al. | 152/152.1 |
| 2007/0146124 A1* | 6/2007 | Shinmura | 340/447 |
| 2008/0216566 A1* | 9/2008 | Vickery | 73/146.2 |
| 2011/0041309 A1* | 2/2011 | Shepler | 29/428 |

OTHER PUBLICATIONS

Japanese Patent Abstract, Publication No. 2004114788, Published Apr. 15, 2001.

European Search Report completed Oct. 13, 2010.

* cited by examiner

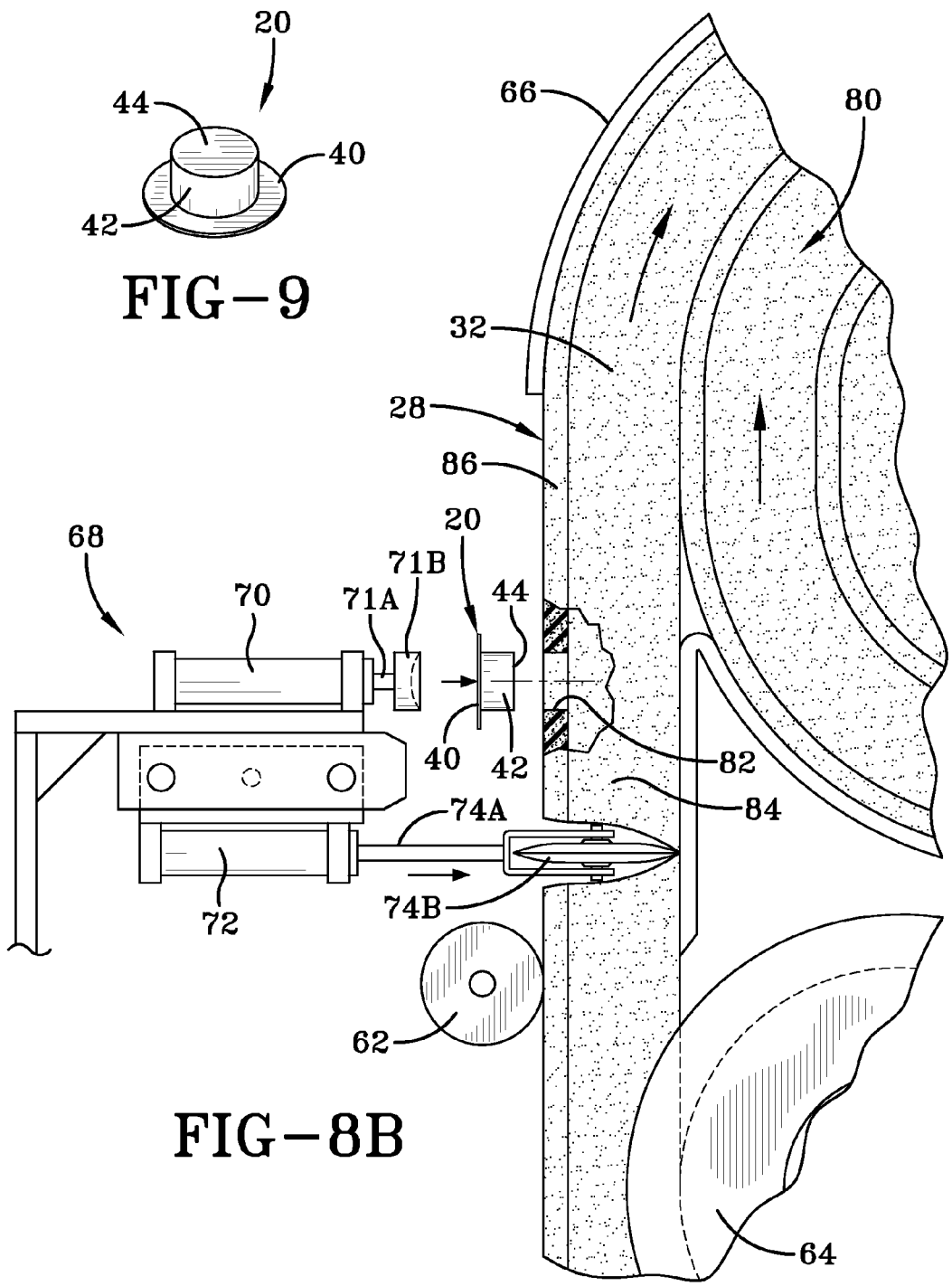

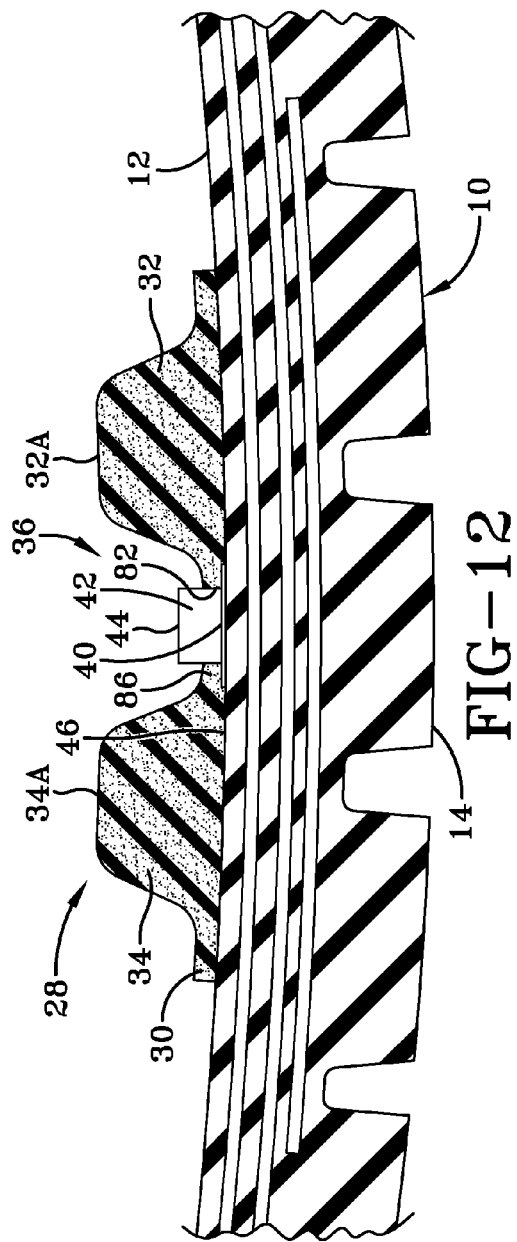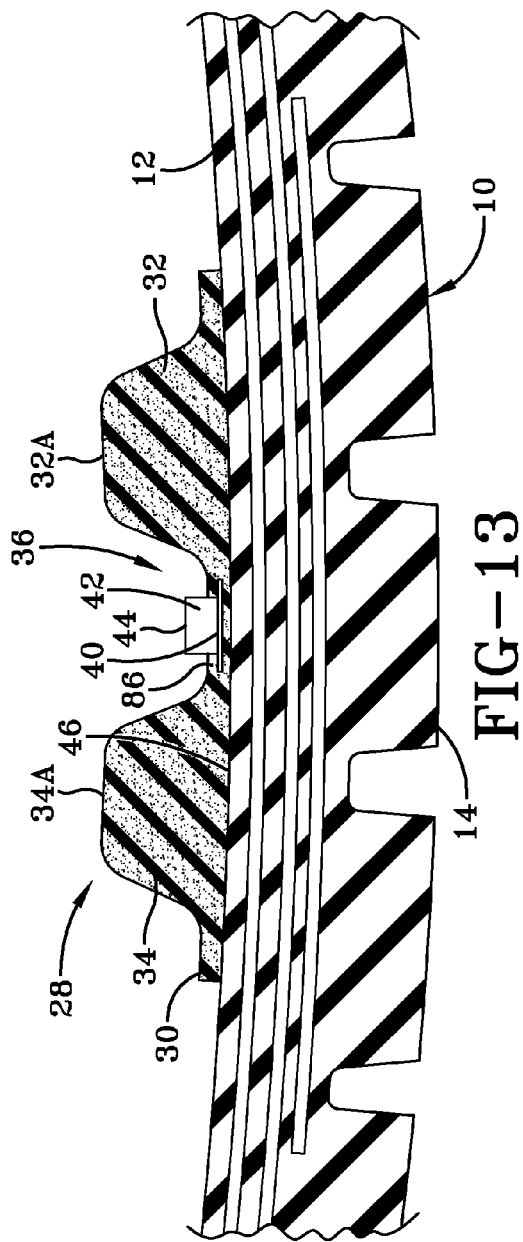

TIRE AND ELECTRONIC DEVICE ASSEMBLY

FIELD OF THE INVENTION

The invention relates generally to a tire having a tire parameter measuring device attached thereto and, more specifically to a tire and electronic device assembly affixed to the tire a post-cure finished tire procedure.

BACKGROUND OF THE INVENTION

It is desirable in certain applications to install electronic device such as a pressure sensor into a tire for monitoring the air pressure within a tire cavity. The operation of the electronic device must be reliable and capable of withstanding the potentially damaging rigors of the installation procedure as well as tire operation.

SUMMARY OF THE INVENTION

According to an aspect of the invention, a tire and electronic device assembly is disclosed, the electronic device measuring one or more tire parameters. The electronic device attaches to a cellular insert member to create a sub-assembly, the insert member having an inward surface attached on a centerline of the tire to an inward facing tire surface defining a tire cavity. The electronic device attaches to the cellular insert member between raised regions of the cellular insert member with an outward surface of the device uncovered and exposed and recessed below outward boundaries of the raised regions In another aspect, the electronic device may be embedded into the cellular insert member between raised regions of the cellular insert member. The cellular insert member may be configured, in a further aspect, as an elongate foam strip dimensioned to attach to the inward facing tire surface along the tire centerline. In still another aspect, the electronic device may be press inserted through a sized aperture within the insert member.

DEFINITIONS

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tread that may extend circumferentially or laterally about the tread in a straight, curved, or zigzag manner. Circumferentially and laterally extending grooves sometimes have common portions. The "groove width" is equal to tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are substantially reduced depth as compared to wide circumferential grooves which the interconnect, they are regarded as forming "tie bars" tending to maintain a rib-like character in tread region involved.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which:

FIG. 8B is an enlarged view of a portion of the machine of FIG. 6 showing operation of the cutting and punch mechanisms.

FIG. 9 is a perspective view of an electronic device.

FIG. 12 is a sectional view of a tire taken through the crown region and showing the foam insert and electronic device affixed to the interior tire equatorial surface.

FIG. 13 is a sectional view of a tire taken through the crown region and showing an alternatively configured sub-assembly in which the electronic device is embedded within the foam insert.

DETAILED DESCRIPTION OF THE INVENTION

Figure 1:
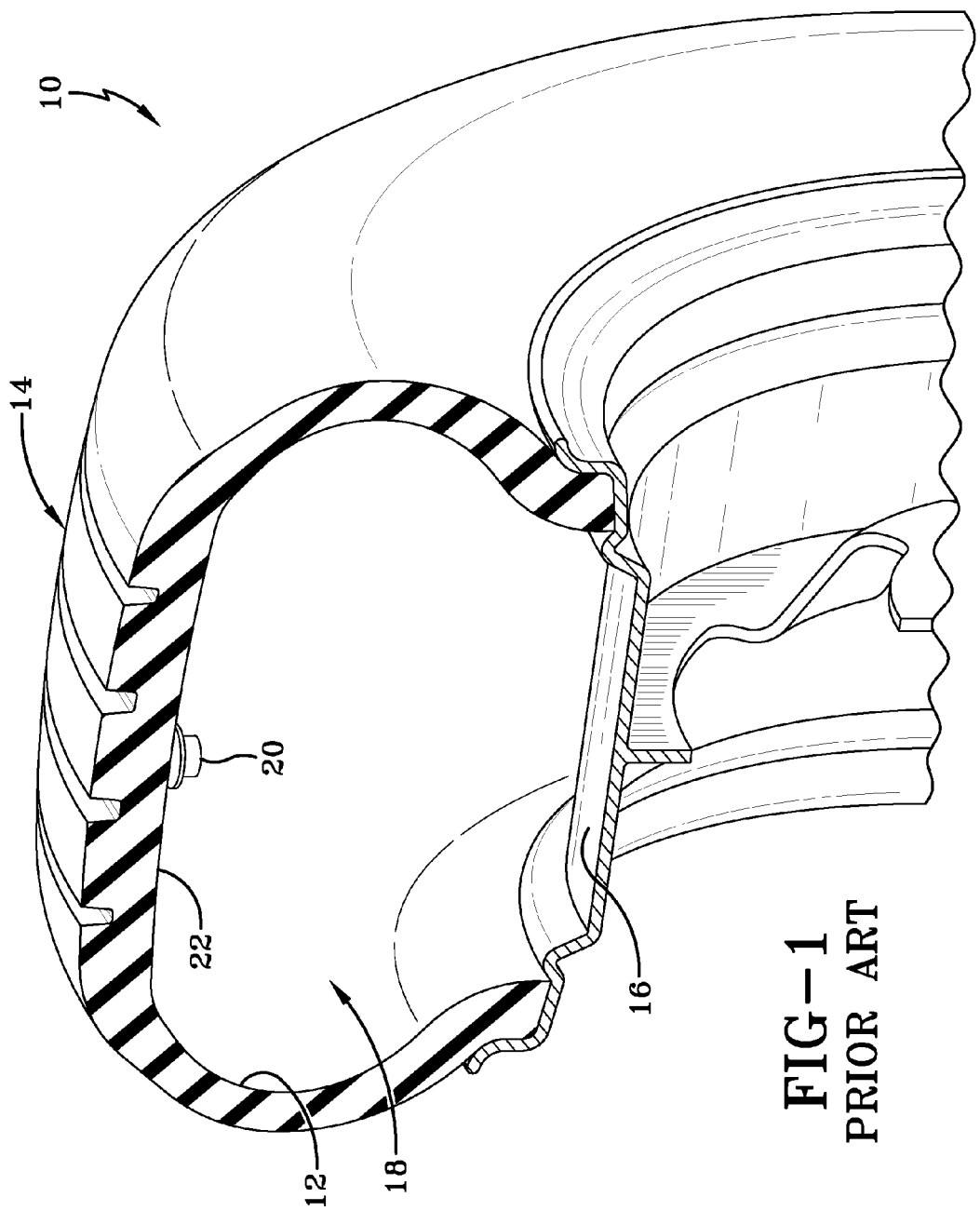
FIG. 1 is a perspective view of a prior art finished tire and electronics device assembly having a portion of the tire removed for the purpose of illustration.

Referring initially to FIG. 1, a tire 10 is shown having an inner liner 12, a crown or tread region 14 mounted to a wheel rim 16. The inner liner defines a tire cavity 18. An electronic device 20 of a type commercially available is employed to monitor certain tire characteristics such as air pressure and temperature within the cavity 18. Such a device 20 may be mounted to the inner liner 12 on the equatorial centerplane of the tire as shown in FIG. 1 by adhesive or other suitable means. Locating the electronic device 20 on a cavity defining surface 22 beneath the tread region 14 serves to maintain attachment integrity between the device and the tire because such a location experiences relatively low flexing during tire use.

Figure 2:
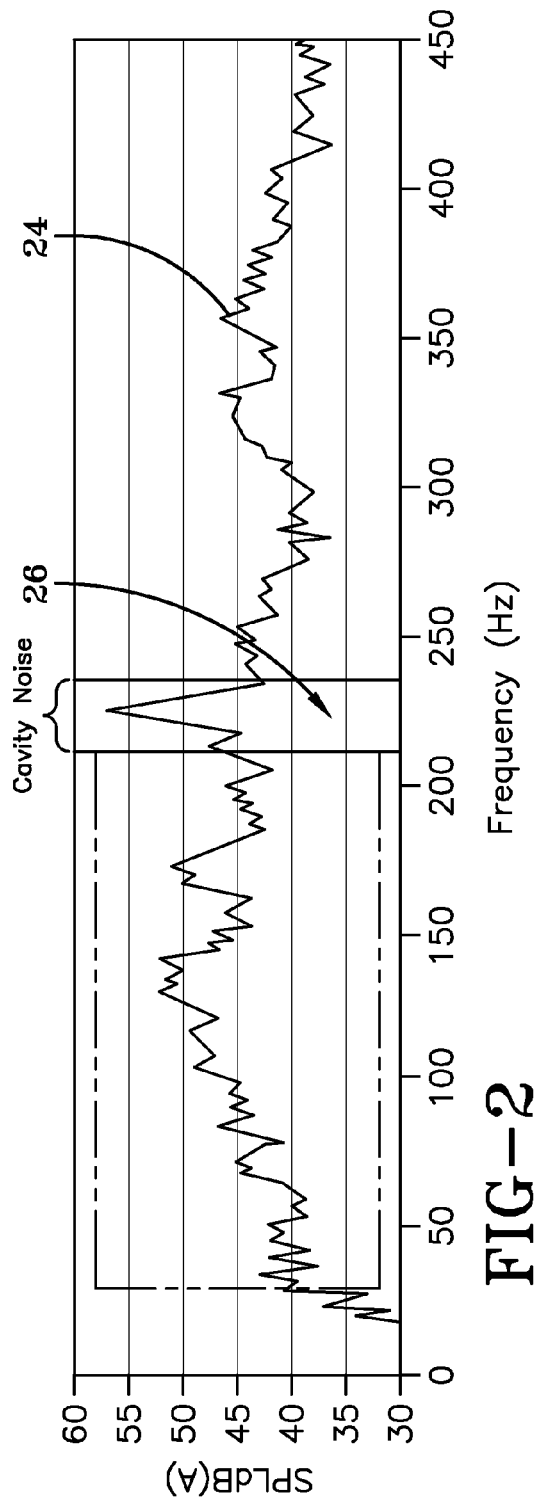
FIG. 2 is a graph of car interior noise spectrum plotting frequency (Hz) against SPL dB (A).
Figure 3:
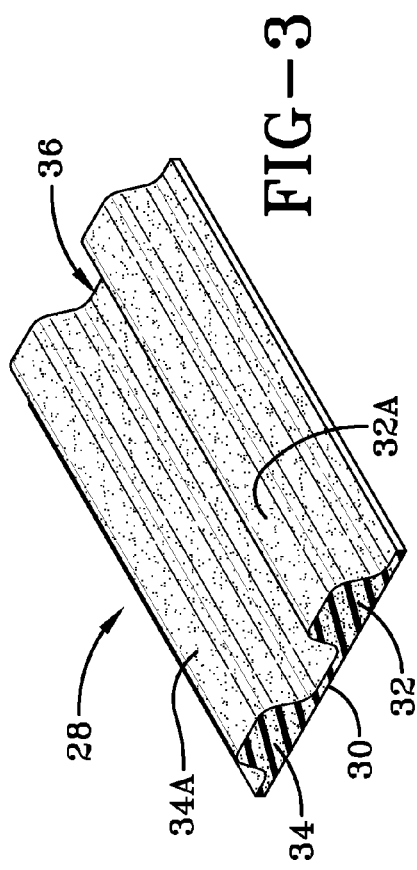
FIG. 3 is a portion of a noise attenuation foam strip.
Figure 4:
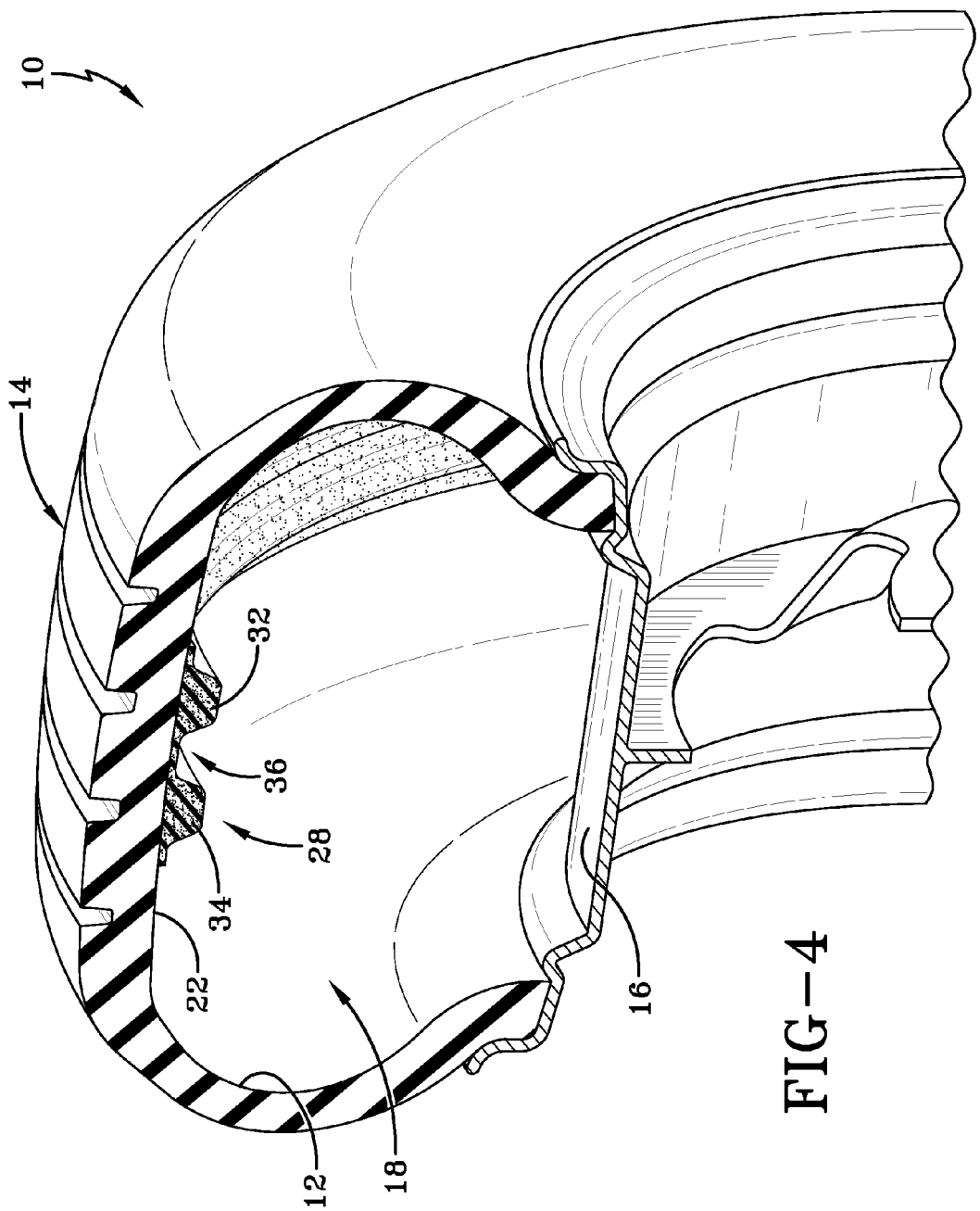
FIG. 4 is a perspective view of a portion of a finished tire having a foam insert attached thereto.
Figure 5:
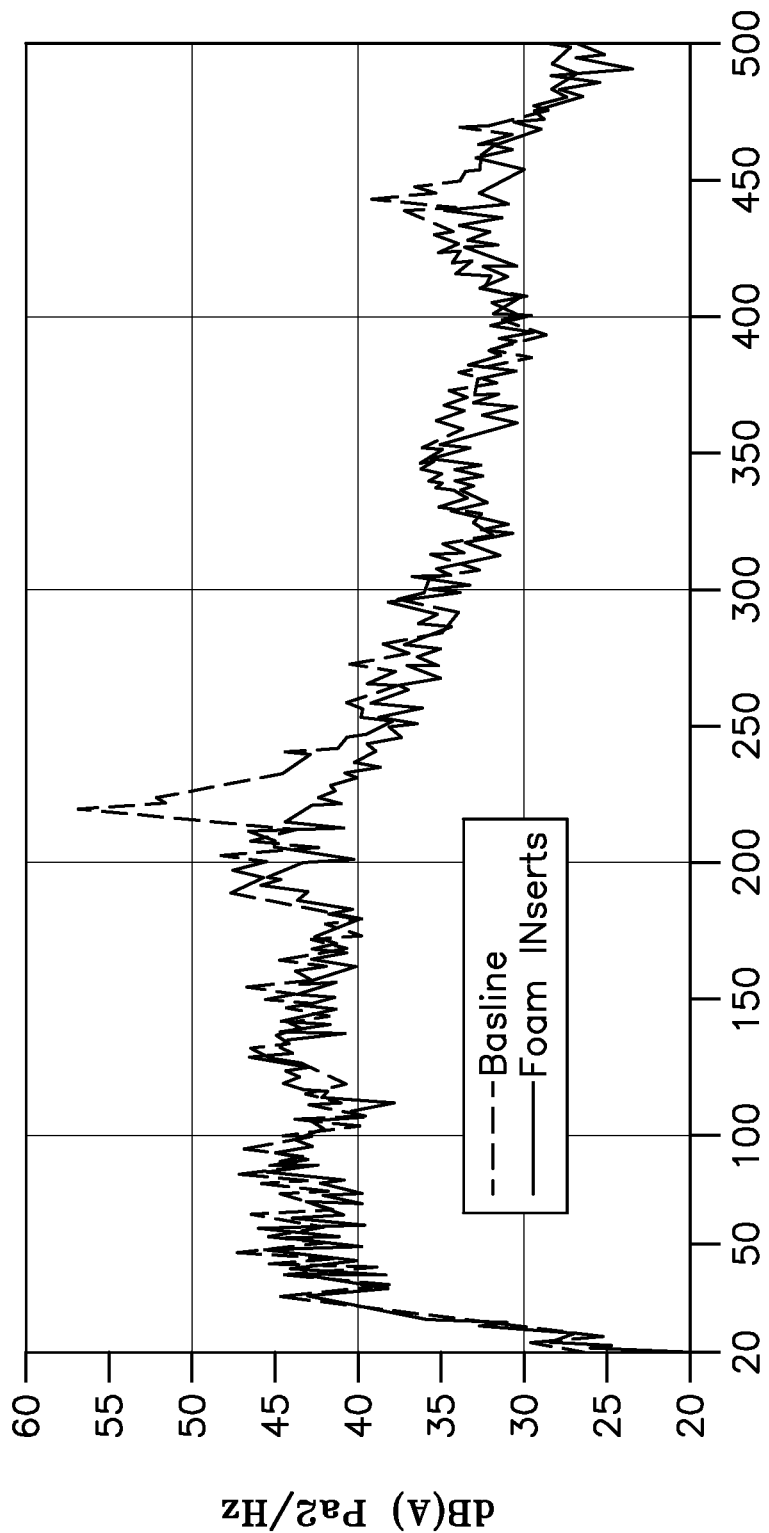
FIG. 5 is a graph of car interior noise spectrum with the foam insert sub-assembly affixed to the tire, plotting frequency (Hz) against SPL dB (A).
Figure 7:
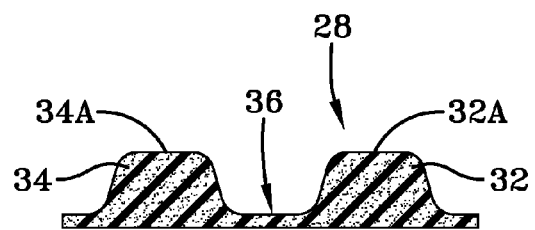
FIG. 7 is a cross-sectional view through the foam insert member.

Cavity noise generated by the tire during normal operation is typically undesirable and it is an objective to reduce or minimize such noise. As shown by the spike 26 of the graph of FIG. 2, tire cavity noise generated by air resonance within the cavity contributes significantly to car interior noise within the frequency range identified. A cellular insert member 28 in the configuration shown in FIGS. 3 and 7 may be introduced within the cavity 18 to attenuate such noise. The cellular insert member 28 may be in the form of an elongate strip attached at an operable location to the tire cavity defining surface 22 on the centerline of the tire tread region as shown in FIG. 4 by adhesive application. So positioned, the strip or insert member 28 (used herein interchangeably) attenuates air resonance induced noise within the tire cavity. The result is an improved decrease in noise as indicated in the graph of FIG. 5.

The foam insert or strip 28 is of cellular construction and composed of commonly available cellular material or materials such as polyurethane. The insert 28 is geometrically configured to have a flat base portion 30 with separated raised regions 32, 34 extending outward from the base 30 to region top extremities 32A, 34A, respectively. In section, the strip 28 is of M-shape with a bight opening 36 between the raised regions 32, 34 extending to a bight floor 38.

With reference to FIGS. 4, 12, and 13, the electronic device 20 is packaged within a protective shell having an large circular base 40, a cylindrical container body 42 extending outward from the base 40 and terminating at an outward facing circular surface 44. Electronics packaged within the body 42 may include a temperature sensor and/or air pressure measuring sensors that communicate through access portals within the surface 44 to measure tire parameters within a tire cavity.

The electronic device 20 and the insert member 28 are preferably combined to create a sub-assembly which is then secured to a cavity defining surface 46 on the centerline of a tire at the crown as shown in FIG. 12 or, alternatively, FIG. 13.

Figure 6:
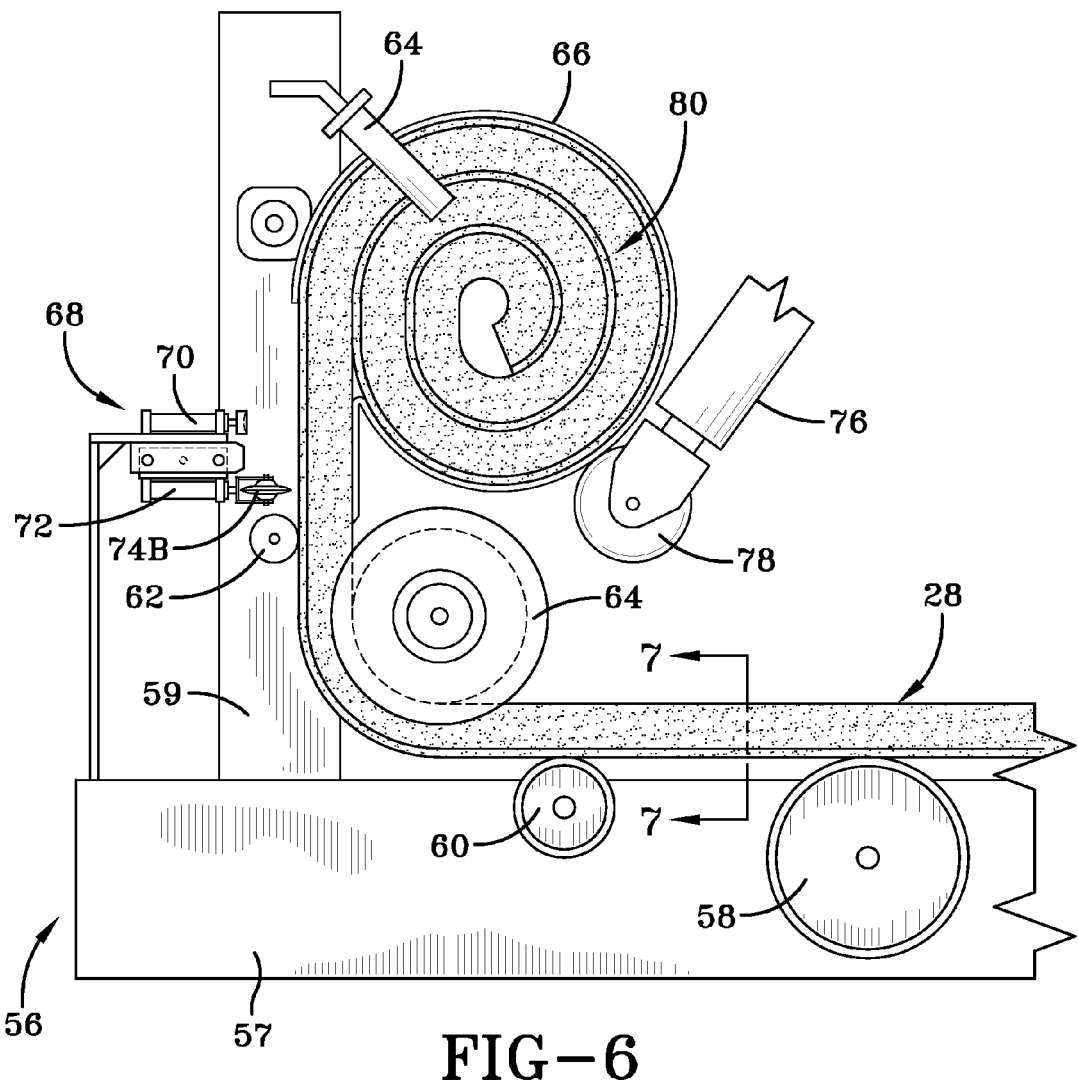
FIG. 6 is a schematic representation of a foam fitting machine.
Figure 11:
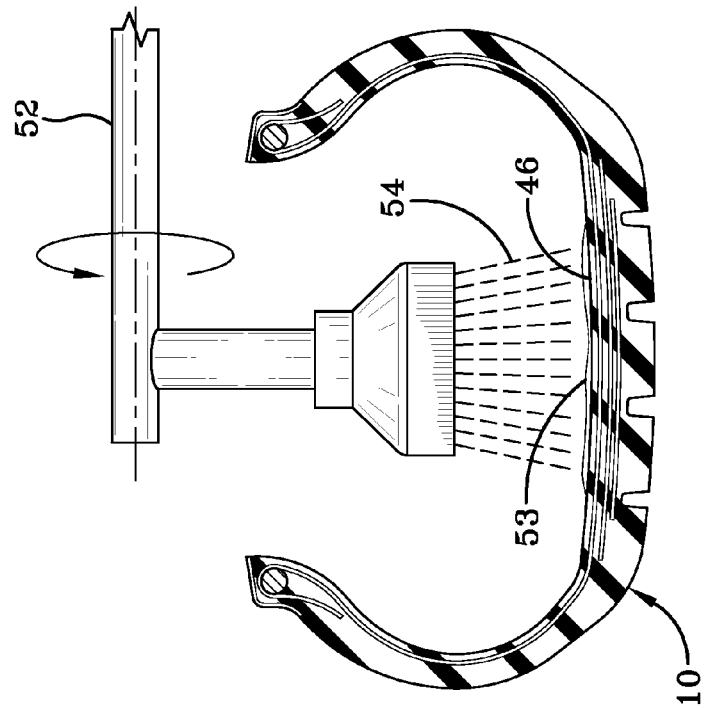
FIG. 11 is a schematic representation of an adhesive applicator machine and tire.
Figure 10:
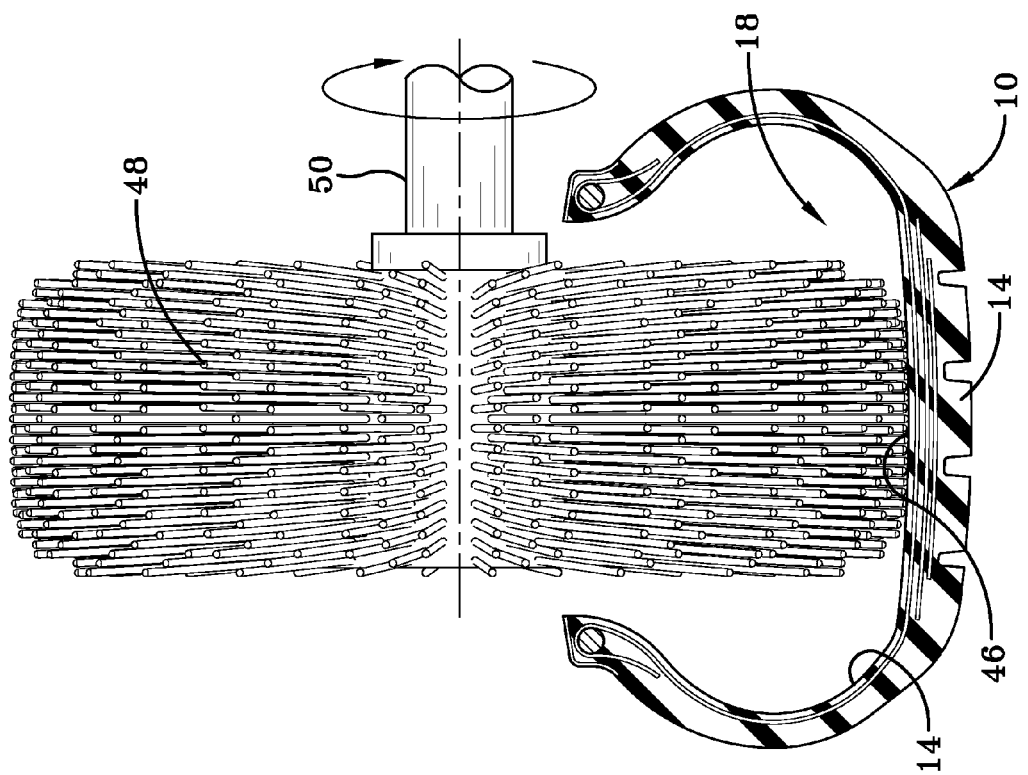
FIG. 10 is a schematic representation of a tire surface buffing machine and tire.

To prepare the tire surface 46, a buffing wheel 48 rotated by shaft 50 is employed as shown in FIG. 10. The wheel 48 contacts and abrades the surface 46 along the centerline of the tire. Thereafter, an adhesive layer 53 is applied to the surface 46 by targeted adhesive spray 54 from an applicator 52 as shown by FIG. 11. The tire 10 is thus prepared for receipt and attachment to the insert member/electronic component sub-assembly in a post-cure procedure. The sub-assembly is constructed as will be explained with reference to FIGS. 6, 8A, and 8B.

As referenced herein, a "sub-assembly" is created by the attachment of an electronic device 20 to the cellular insert 28. As explained previously, the insert 28 is preferably in strip form having contoured raised portions 32, 34 that define a bight recess or valley 36 therebetween within which the electronic device 20 is attached and situated. The strip insert 20 is of cellular or foam construction so as to provide noise attention within the cavity of the tire to which the sub-assembly is attached. As seen from FIGS. 6, 8A, and 8B, the assembly of the electronic device 20 and foam insert 28 occurs at a foam fitting machine station 56. The foam strip 28 is fed by means of feed rollers 60, 62, and roller guide 64 into a circular forming shell 66. The foam strip 28 thus assumes a spiral roll 80 for readily facilitating transportation between the machine 56 and an insert to tire assembly station. The fitting machine 56 includes a pneumatic or hydraulic powered cutter and punch mechanism 68 mounted adjacent to the foam insert feed path as shown. The cutter and punch mechanism 68 includes a punch 70 having a reciprocating actuator arm 71A and a cylindrical punch die 71B mounted to the remote end of arm 71A. The movement of the arm 71A is generally perpendicular to the path of travel of the foam strip 28 prior to the strip 28 entering the forming shell 66.

A cutter mechanism 72 is mounted adjacent to the punch mechanism 68 and includes a reciprocating actuator rod 74A having a rotary cutting blade 74B mounted to a forward end. A tensioning arm 76 is positioned adjacent to the forming shell 66 and engages the shell to compress the shell against the foam insert strip 28 in the roll configuration 80.

Figure 8A:
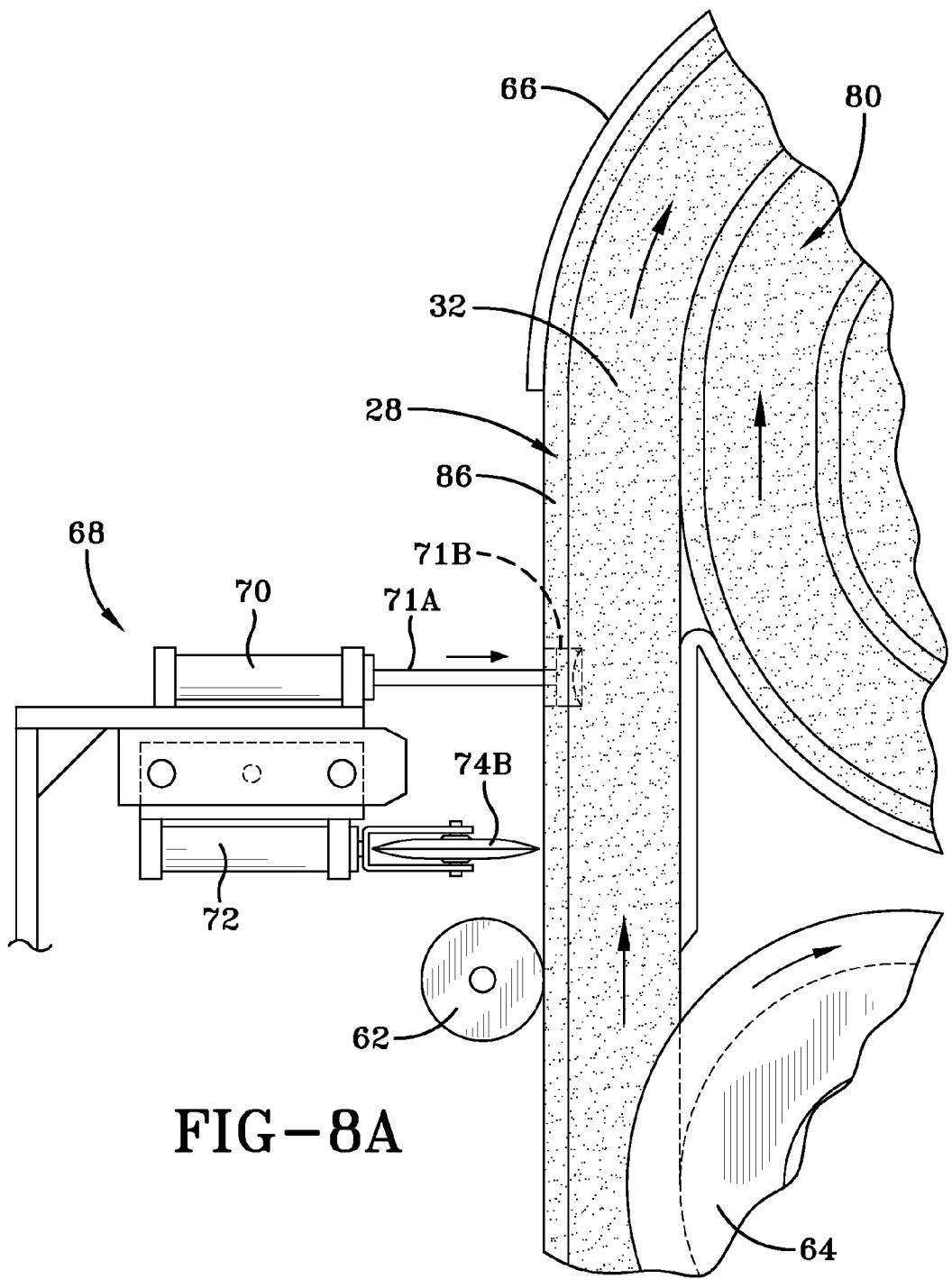
FIG. 8A is an enlarged view of a portion of the foam fitting machine of FIG. 6.

The operation of the punch and cutting mechanisms 70, 72 will be appreciated from FIGS. 8A and 8B. The length of foam strip 28 is formed into the roll configuration 80 and is sized in length to coincide with the circumferential dimension of the tire centerline onto which the insert is to be mounted. The punch mechanism is actuated to move into engagement with a free end 84 of insert foam strip 28. The punch head 71B is sized to create a sized aperture 82 through the base 86 of the strip 28 at the free end 84 of the strip 28; the aperture 82 being generally configured to conform to and complement the dimension and shape of the body 42 of the electronic device 20. The cylindrical external geometry of the device body 42 closely fits with interference within the complementary shape and size of the aperture 82. After the aperture 82 is created, the electronic device body 42 is press fit inserted through the aperture 82 with the device exposed surface 44 thus positioned between raised insert regions 32, 34. The device 20 thus forms with the insert strip 28 a sub-assembly for transport to the station designated for assembly of the sub-assembly to a tire. The device is protected by the foam strip 28 during transportation and operational use as will be appreciated from FIGS. 12 and 13.

The insert strip 28 in the roll configuration 80 is cut to the desired length by operation of the cutting mechanism 72. Blade 74B is moved axially inward by the rod 74A and severs through the strip 28 at the appropriate point. The roll 80 may be carried to the tire assembly station within the forming shell 66 with the electronic device 20 carried by and secured to the free strip end 84 of the roll 80.

FIGS. 12 and 13 illustrate alternative means for attaching the electronic device to the cellular insert strip. In FIG. 12, the electronic device 20 remains within the aperture 82 as described above in reference to FIGS. 8A and 8B. The insertion of the device 20 through the aperture 82 with interference places the larger diameter base flange 40 of the device 20 against the flat underside of the strip base 86. The sub-assembly is unrolled along the centerline of the tire inner liner 12 beneath the crown or tread 14 and is attached to the cavity defining inner liner centerline surface 46 by adhesive. The adhesive may be selectively applied to the target surface 46 as shown in FIG. 1. So positioned, the outward surface 44 of the electronic device 20 is uncovered and exposed so that the internal air pressure within cavity 18 of the tire may be measured by a pressure sensor within device 20 through a passageway (not shown) extending through surface 44 of the device 20. Moreover, it will be appreciated that the device 20 is recessed a distance from the extremities 32A and 34A of the raised portions 32, 34. The device 20 and the electronics housed therein are thereby protected by the cellular insert strip raised portions 32, 34 from potentially damaging contact during use within the tire cavity. If desired, the electronic device 20 may be removed temporarily at the point of installation of the sub-assembly to the tire and adhesive applied to the aperture 82 of the strip. The device 20 may thereafter be re-inserted into the aperture 82 and retained therein by the friction fit as well as the applied adhesive. The attachment of the sub-assembly is preferably to a post-cure tire.

An alternative means for affixing the device 20 to the insert cellular strip 28 is shown in FIG. 13. As depicted, the larger diameter flange 40 of the device 40 may be embedded within the base layer 86 of the strip 28 by forming the strip around the device 20. Embedding the flange 40 secures the device 20 to the strip without the need for adhesive application. The position of the device 20 is the same in FIG. 13 and in FIG. 12; that is, between and recessed relative to the raised regions 32, 34 of the strip 28. Protection of the device 20 from external contact is thereby enhanced by its location between the raised regions. The outward surface 44, as in the attachment means shown by FIG. 12, remains uncovered by the foam strip 28 and in a position to allow sensors within the device 20 to operably measure tire parameters within the tire cavity.

The method for installing the electronic device 20 to the tire 10 will be seen to include: affixing the electronic device 20 to a cellular insert member 28 at a pre-selected location to create a sub-assembly. The insert member has an inward surface shown as the underside of base 86 configured to attach to an inward facing tire surface 46 partially defining the tire cavity 18. The sub-assembly is accordingly attached to the inward facing tire surface 46 at an operable location from which to monitor tire parameters such as temperature and pressure within the tire.

The electronic device 20 may be embedded into the cellular insert member as shown by FIG. 13 or affixed as shown in FIG. 12 between raised regions 32, 34 of the cellular insert member 28. The electronic device 20 may be configured to have one or more passageways (not shown) extending through an outward surface 44 to facilitate sensor measurement. The surface 44 preferably remains exposed and uncovered by the cellular insert member at a pre-selected location so as not to obstruct passageway(s) extending through the surface 44. The inward facing tire surface 46 is preferably located at the tire centerline and the cellular insert member is shaped as an elongate foam strip dimensioned to attach to the inward facing tire surface 46 along the tire centerline. The method of use may include transporting the sub-assembly to the tire in a roll with the electronic device 20 situated in an accessible location proximate to a free end 84 of the roll during transportation of the sub-assembly. The electronic device may be press inserted through a sized aperture 82 within the free end 84 of the insert member 28 for transportation of the sub-assembly to a tire. By locating the device 20 in the free end 84, the device 20 does not interfere with the formation of roll 80 and may be readily removed at the tire for application of adhesive to the aperture 82.

A tire and electronic device assembly is disclosed, the electronic device measuring one or more tire parameters. The electronic device attaches to a cellular insert member to create a sub-assembly, the insert member having an inward surface attached on a centerline of the tire to an inward facing tire surface defining a tire cavity. The electronic device attaches to the cellular insert member between raised regions of the cellular insert member with an outward surface of the device uncovered and exposed and recessed below outward boundaries of the raised regions.

The electronic device 20 may be either embedded into the cellular insert member between raised regions of the cellular insert member 28 or press inserted through the member 28. Adhesive may further be employed to secure the attachment between the device 20 and the insert strip 28. The cellular insert member 28 may be configured as an elongate foam strip dimensioned to attach to the inward facing tire surface 46 along the tire centerline.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire and electronic device assembly, the tire having a cavity defined by an tire inner surface and the electronic device having at least one sensor for monitoring at least one tire parameter, the assembly comprising:

a cellular insert member having a radially outward surface attached against an inward facing tire inner surface region;

the cellular insert member having raised regions defining an outwardly exposed recess therebetween;

the electronic device having a central body extending to an outward central surface and an outwardly extending retention flange attached to and extending from the central body;

the electronic device attaching to the insert member within the recess between the raised region wherein the electronic device central body resides exposed within the outwardly exposed recess between the raised regions; and the electronic device retention flange engages the insert member to affix the electronic device to the insert member and center the electronic device within the exposed recess between the raised regions;

wherein the electronic device comprises lateral sides and an outward surface exposed and uncovered by the cellular insert member within the recess; and wherein the recess is a sized aperture and the electronic device is press fit through the sized aperture within the cellular insert member and with lateral sides of the electronic device positioned adjacent the raised regions of the cellular insert member and the retention flange of the electronic device abutting an underside of the insert member.

2. The assembly of claim 1, wherein the outward exposed surface of the electronic device is recessed and offset from raised extremities of the raised regions of the cellular insert member.

3. The assembly of claim 1, wherein the insert member comprises a cellular elongate strip.

4. The assembly of claim 1, wherein the inward facing tire surface is located at the tire centerline and the cellular insert member comprises an elongate foam strip dimensioned to attach to the inward facing tire surface along the tire centerline.

* * * * *